(12) United States Patent
Pfeiffer (10) Patent No.: US 8,831,163 B2
(45) Date of Patent: Sep. 9, 2014

(54) METHOD FOR MEASURING THE NEUTRON FLUX IN THE CORE OF A NUCLEAR REACTOR USING A COBALT DETECTOR AND ASSOCIATED DEVICE

(75) Inventor: Maxime Pfeiffer, Paris (FR)

(73) Assignee: Areva NP, Courbevoie (FR)

( * ) Notice: Subject to any disclaimer, the term of this patent is extended or adjusted under 35 U.S.C. 154(b) by 501 days.

(21) Appl. No.: 13/142,801

(22) PCT Filed: Dec. 29, 2009

(86) PCT No.: PCT/FR2009/052715
§ 371 (c)(1),
(2), (4) Date: Aug. 22, 2011

(87) PCT Pub. No.: WO2010/076538
PCT Pub. Date: Jul. 8, 2010

(65) Prior Publication Data
US 2011/0293058 A1  Dec. 1, 2011

(30) Foreign Application Priority Data

Dec. 30, 2008 (FR) ...................................... 08 59112

(51) Int. Cl.
*G21C 17/108* (2006.01)
*G01T 3/00* (2006.01)
*G21C 17/00* (2006.01)

(52) U.S. Cl.
USPC ................. 376/254; 376/245; 976/DIG. 207; 976/DIG. 236; 976/DIG. 238; 250/336.1; 250/390.01

(58) Field of Classification Search
CPC ...... G21C 17/00; G21C 17/10; G21C 17/108; G01T 3/00; G01T 3/006

USPC .......... 376/245, 254, 255, 153, 154; 976/DIG. 207, DIG. 236, DIG. 238; 250/336.1, 370.01, 370.04, 370.05, 250/390.01–392

See application file for complete search history.

(56) References Cited

U.S. PATENT DOCUMENTS 3,375,370 A * 3/1968 Hilborn .......................... 376/153
3,760,183 A * 9/1973 Neissel .......................... 376/254

(Continued)

OTHER PUBLICATIONS

Sovka J A: "Response of Cobalt Neutron Flux Detectors" Research Report of the Atomic Energy of Canada, 1969, pp. 1-31.

(Continued)

*Primary Examiner* — Bernarr Gregory
(74) *Attorney, Agent, or Firm* — Davidson, Davidson & Kappel, LLC (57) ABSTRACT

A method for measuring the neutron flux in the core of a nuclear reactor, the method including several steps recurrently performed at instants separated by a period, the method comprising at each given instant the following steps: acquiring a total signal by a cobalt neutron detector placed inside the core of the reactor; assessing a calibration factor representative of the delayed component of the total signal due to the presence of cobalt 60 in the neutron detector; assessing a corrected signal representative of the neutron flux at the detector from the total signal and from the calibration factor; assessing a slope representative of the time-dependent change of the calibration factor between the preceding instant and the given instant; the calibration factor at the given instant being assessed as a function of the calibration factor assessed at the preceding instant, of the slope, and of the time period separating the given instant from the preceding instant.

12 Claims, 5 Drawing Sheets

(56) References Cited

U.S. PATENT DOCUMENTS

| | | | | |
|---|---|---|---|---|
| 3,780,292 A | * | 12/1973 | Klar | 376/255 |
| 3,787,697 A | * | 1/1974 | Shields | 250/370.04 |
| 3,872,311 A | * | 3/1975 | Goldstein et al. | 250/370.04 |
| 3,904,881 A | * | 9/1975 | Klar et al. | 250/390.01 |
| 3,931,523 A | * | 1/1976 | Ambardanishvili et al. | 250/390.01 |
| 4,090,083 A | * | 5/1978 | Wyvill | 250/390.01 |
| 4,123,658 A | * | 10/1978 | Johansson | 250/390.01 |
| 4,140,910 A | * | 2/1979 | Kroon | 250/390.01 |
| 4,197,463 A | | 4/1980 | Goldstein et al. | |
| 4,237,380 A | * | 12/1980 | Playfoot et al. | 250/370.04 |
| 4,284,893 A | * | 8/1981 | Allan et al. | 250/390.01 |
| 4,333,797 A | | 6/1982 | Nishizawa | |
| 4,343,994 A | * | 8/1982 | Farcy | 250/390.01 |
| 4,363,970 A | * | 12/1982 | Allan et al. | 250/390.01 |
| 4,381,451 A | * | 4/1983 | Chen et al. | 250/390.01 |
| 4,396,839 A | * | 8/1983 | Playfoot et al. | 250/390.01 |
| 6,400,786 B1 | * | 6/2002 | Mourlevat et al. | 376/254 |
| 6,430,247 B1 | * | 8/2002 | Mourlevat et al. | 376/254 |

OTHER PUBLICATIONS

Goldstein et al., "A Survey of Self-Powered Detectors—Present and Future" IEEE Transactions on Nuclear Science, vol. NS-26, No. 1, 1979, pp. 916-923.

* cited by examiner

METHOD FOR MEASURING THE NEUTRON FLUX IN THE CORE OF A NUCLEAR REACTOR USING A COBALT DETECTOR AND ASSOCIATED DEVICE

The present invention generally relates to the measurement of the neutron flux in the core of a nuclear reactor.

More specifically, the invention according to a first aspect relates to a method for measuring the neutron flux in the core of a nuclear reactor.

BACKGROUND

It is necessary to know the state of the core of a nuclear reactor, in order to guarantee safety (protection of the fuel assemblies) and proper operation of this reactor. For this purpose, it is possible to track several parameters related to the bulk power of the core: the linear power along the axis of the core, the CHFR (Critical Heat Flux Ratio), the axial and radial power disequilibrium, etc. Neutron detectors are used for reconstructing these parameters, because they depend on the neutron flux in the core.

Several types of neutron detectors are used:

detectors known as "excore chambers", which are placed outside the core and which give a signal proportional to the mean flux in a quarter of the core;

"incore" detectors which are located inside the core. Certain incore detectors are mobile. They are periodically inserted into the core in order to establish a specific image of the power distribution in the core.

Other incore detectors are fixed and continuously give a signal representative of the local neutron flux in an area of the core of the reactor. The fixed detectors are permanently subject to irradiation, which in the long run causes a loss of sensitivity of these detectors and a degradation of the accuracy of the corresponding signal.

The use of cobalt neutron detectors as fixed incore detectors is known. These detectors behave like passive current generators, the current being generated by nuclear reactions within the detector under the effect of the neutron flux. Activation of cobalt 59 into cobalt 60 in the detector has the long-run effect of deteriorating the useful signal/total signal ratio of this detector, which is detrimental to the accuracy of the measurement.

SUMMARY OF THE INVENTION

An object of the invention is to provide a method for measuring the neutron flux in the core of a nuclear reactor by means of a cobalt neutron detector with which better accuracy may be obtained.

More specifically, the invention provides a method for measuring the neutron flux in the core of a nuclear reactor, the method comprises several steps performed recurrently at instants separated by a period, the method comprising at each given instant the following steps:

acquiring a total signal by means of a cobalt neutron detector placed inside the core of the nuclear reactor;

assessing a calibration factor representative of the delayed component of the total signal due to the presence of cobalt 60 in the detector;

assessing a corrected signal representative of the neutron flux at the detector from the total signal and from the calibration factor;

assessing a representative slope of the time-dependent change of the calibration factor between the preceding instant and the given instant;

the calibration factor at a given instant being assessed as a function of the calibration factor assessed at the preceding instant, of the slope and of the period separating the given instant from the preceding instant.

The method may also have one or more of the characteristics considered below, individually or according to all the technically possible combinations:

the neutron detector is a fixed detector;

the slope at the given instant is assessed at least as a function of the corrected signal at the preceding instant and of the calibration factor at the preceding instant;

the measurement method comprises at each given instant $T^N$ a step for assessing a load factor representative of the time-dependent change of the power of the reactor locally around the neutron detector between the preceding instant $T^{N-1}$ and the given instant, the slope at the given instant being also assessed as a function of the load factor;

the load factor at each given instant is assessed by calculating the average power of the reactor locally around the neutron detector between the preceding instant and the given instant, and by dividing said average power by the value of the power of the reactor locally around the neutron detector at the preceding instant;

the measurement method comprises at each given instant a step for assessing a load factor representative of the time-dependent change of the power of the reactor between the preceding instant and the given instant, the slope at the given instant being also assessed as a function of the load factor.

According to a second aspect, the invention provides a device for measuring the neutron flux in the core of a nuclear reactor, the measurement device comprising at least one cobalt neutron detector placed inside the core of the reactor, and a computer;

the computer having means for acquiring recurrently at given instants separated by a period, a total signal by means of the neutron detector;

the computer having means for assessing at each given instant a calibration factor representative of the delayed component of the total signal due to the presence of cobalt 60 in the neutron detector;

the computer having means for assessing at each given instant a corrected signal representative of the neutron flux at the neutron detector from the total signal and from the calibration factor;

the computer having means for assessing at each given instant a representative slope of the time-dependent change of the calibration factor between the preceding instant and the given instant, the means for assessing the calibration factor being capable of assessing the calibration factor at the given instant as a function of the calibration factor assessed at the preceding instant, of the slope, and of the period separating the given instant from the preceding instant.

The device may also have one or more of the characteristics below, considered individually or according to all the possible combinations:

the neutron detector is a fixed detector;

the means for assessing the slope are able to assess the slope at the given instant at least as a function of the corrected signal at the preceding instant and of the calibration factor at the preceding instant;

the measurement device comprises means for assessing at each given instant a load factor representative of the time-dependent change of the power of the reactor locally around the detector between the preceding instant and the given instant, the means for assessing the slope being capable of assessing the slope at the given instant also as a function of the load factor;

the means for assessing the load factor are capable of assessing the load factor at each given instant by calculating the average power of the reactor locally around the neutron detector between the preceding instant and the given instant, and by dividing said average power by the value of the power of the reactor locally around the neutron detector at the preceding instant.

BRIEF DESCRIPTION OF THE DRAWINGS

Other features and advantages of the invention will become apparent from the detailed description which is given below, as an indication and by no means as a limitation, with reference to the appended figures, wherein.

DETAILED DESCRIPTION

Figure 1:
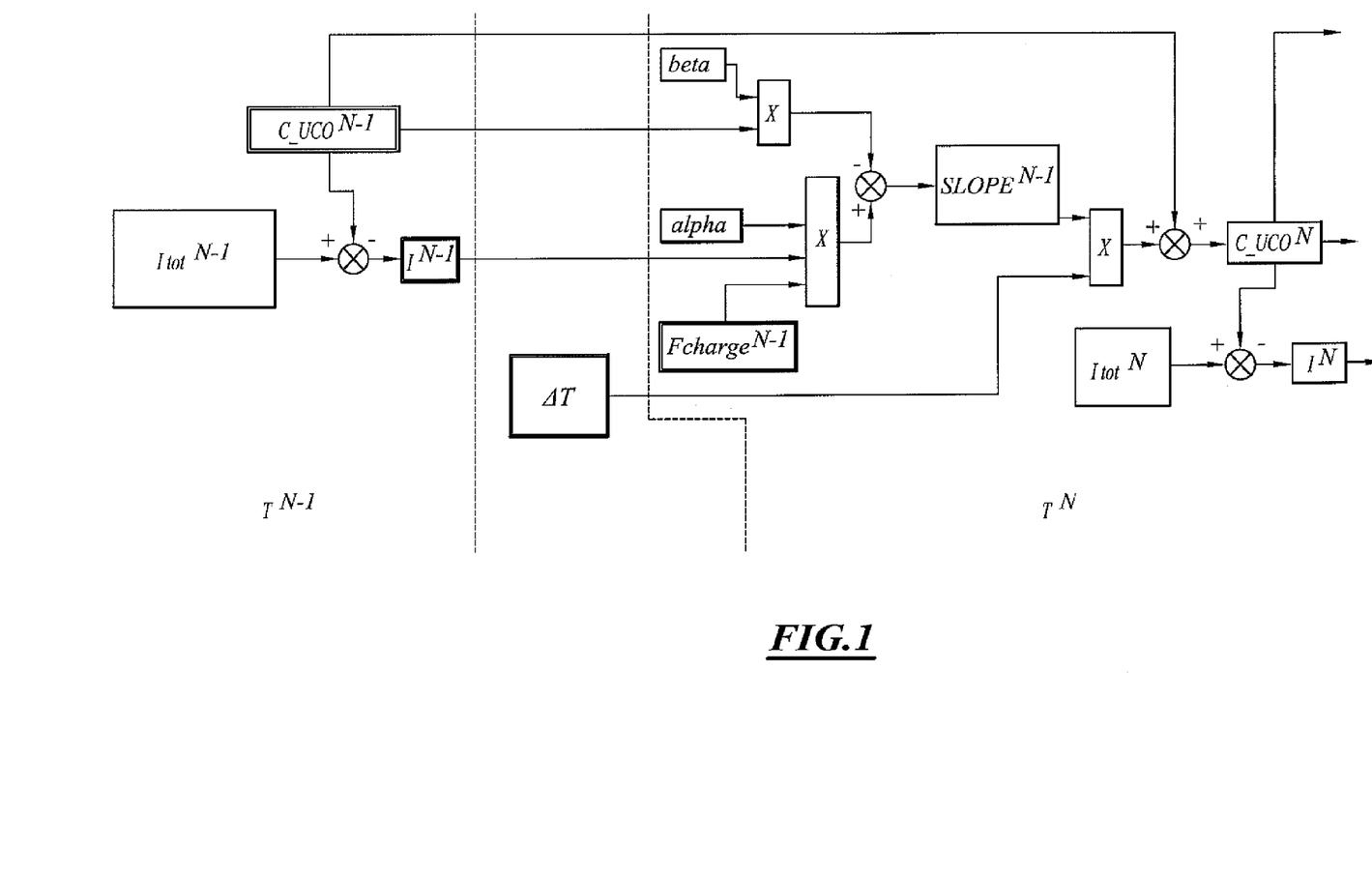
FIG. 1 is a diagram of steps illustrating the method of the invention.

The method, schematically illustrated in FIG. 1, is intended to measure the neutron flux in the core of a nuclear reactor, by means of at least one cobalt neutron detector placed inside the core of the reactor. This type of detector is known under the acronym of Co-SPND (Cobalt-Silver Self Powered Neutron Detector).

Figure 2:
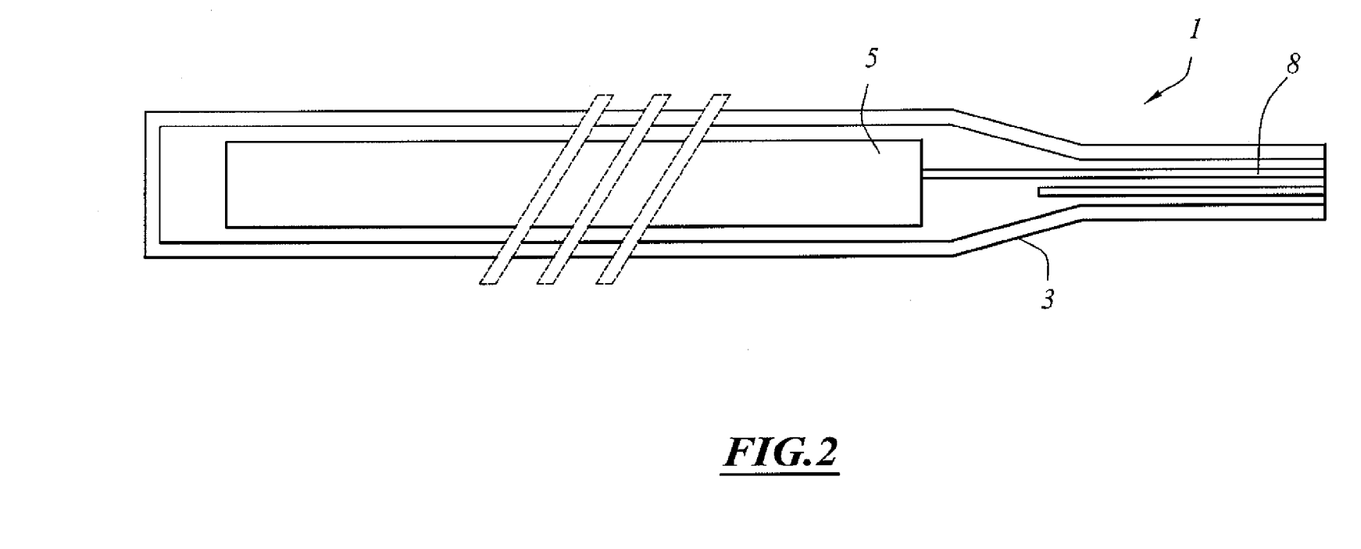
FIG. 2 is a simplified schematic illustration of a cobalt neutron detector.

As shown in FIG. 2, a cobalt neutron detector 1 includes an external sheath 3, and a central emitter 5 positioned inside the sheath 3. The external sheath 3 acts as a cathode, the central emitter 5 acting as an anode. The central emitter 5 before use consists of a material essentially including cobalt 59. The external sheath 3 consists of a electrically conducting material. The central emitter 5 has a diameter of about 2 mm and a length of about 21 cm.

Under the effect of the neutron flux, nuclear reactions occur in the central emitter 5, causing transfer of electrons from the central emitter 5 to the external sheath 3. The central emitter 5 is connected to an amplifier device 7 (see FIG. 7) through an electrically conducting cable 8. The device 7 is capable of amplifying and digitizing the current from the emitter 5. The signal collected by the device 7 will be called a total signal (Itot) in the following.

The detector 1 then acts as a DC current generator. It does not require any exterior power supply. It is therefore particularly adapted to operation as a fixed detector within a nuclear fuel assembly in the core of the nuclear reactor.

The cobalt detectors continuously deliver a signal, the quality of which degrades slowly all along their use in the core. This degradation is expressed by the increasing occurrence of a quasi-static component in the total signal Itot delivered by the detector 1. The significance of this quasi-static component relatively to the useful signal increases over time. Here, by useful signal means the component of the total signal Itot which is proportional to the neutron flux at the detector 1. The quasi-static component, called a delayed component $I_{60}$, is due to the presence of cobalt 60 in the central emitter 5. Cobalt 60 is formed by activation of cobalt 59 under the effect of the neutron flux. This delayed component $I_{60}$ is quasi-static in the sense that it is constant over short time intervals, for example over the whole duration of a power transient in the reactor. Such a power transient lasts for a few hours to a few days. The delayed component $I_{60}$ is therefore de-correlated from the neutron flux, in the sense that it does not vary when the neutron flux varies at the detector 1. The delayed component $I_{60}$ of the neutron flux thus generates a substantial loss of accuracy of the neutron detector 1 during a power transient.

Figure 3:
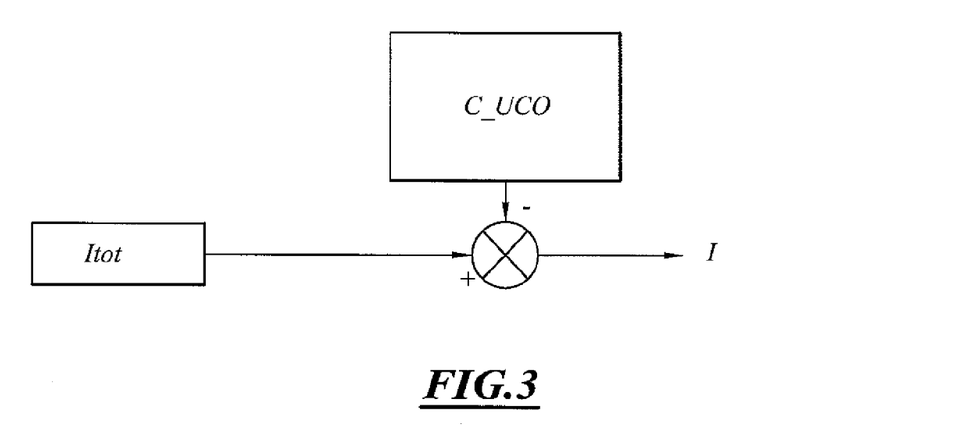
FIG. 3 is a schematic illustration of the method for a posteriori correction of the total signal of the neutron detector.

In order to be able to use the signal continuously delivered by the neutron detector 1, it is therefore necessary to correct this signal a posteriori, as illustrated in FIG. 3. This correction is carried out by subtracting from the total signal Itot a calibration factor C_UCO representative of the delayed component $I_{60}$ due to the presence of cobalt 60 in the detector 1. Thus, the corrected signal is calculated in the following way:

$$I = Itot - C\_UCO$$

In this equation, Itot corresponds to the signal continuously delivered by the neutron detector 1, C_UCO is a calibration factor, and I is the corrected signal (useful signal), this corrected signal being representative of the neutron flux at the detector 1.

C_UCO is periodically determined by a calculation, as explained later on.

Figure 4:
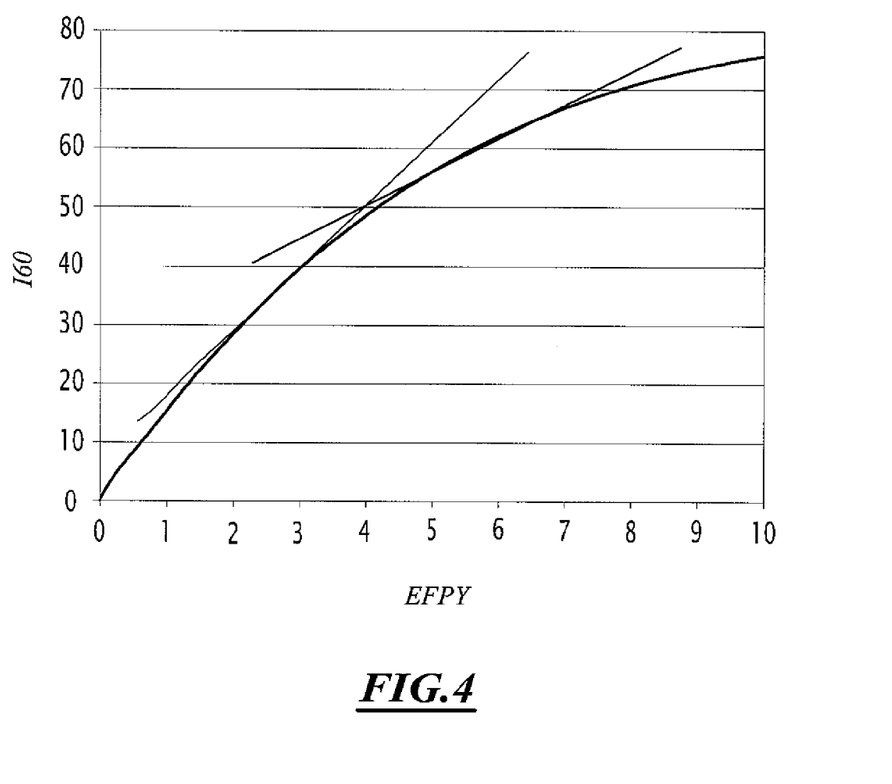
FIG. 4 is a graphic illustration of the time-dependent change versus time of the delayed component of the signal generated by the neutron detector, due to the presence of cobalt 60.

The invention benefits from the fact that, as illustrated in FIG. 4, the delayed component $I_{60}$ of the total signal Itot due to the presence of cobalt 60 in the detector 1, changes slowly over time. FIG. 4 illustrates an exemplary time-dependent change of the delayed component $I_{60}$, for a given detector 1. The axis of the abscissae is graduated in full power yearly equivalents. It is clearly seen from this FIG. 4 that the delayed component $I_{60}$ increases versus time, but on the other hand the slope decreases versus time. The delayed component $I_{60}$ increases slowly and its time-dependent change may be considered as substantially linear over time intervals of the order of one month. On the other hand, the slope has to be re-updated regularly.

Moreover, in the invention it is considered that the time-dependent change in the calibration factor C_UCO versus time is governed by an equation formally analogous to the equation of the time-dependent change in the cobalt 60 content in the central emitter 5. This time-dependent change is discretized with a time step adapted so as to benefit from the quasi-linearity of the delayed component $I_{60}$.

More specifically, as illustrated in FIG. 1, the method comprises several steps, performed recurrently at instants $T^N$, said instants being separated by periods $\Delta T$.

At each instant $T^N$, the following steps are performed:
acquiring a total signal $Itot^N$ by means of the cobalt neutron detector 1;

assessing a slope $SLOPE^{N-1}$ representative of the time-dependent change of the calibration factor C_UCO between the preceding instant $T^{N-1}$ and the given instant $T^N$;

assessing a calibration factor $C\_UCO^N$, representative of the delayed component $I_{60}$ of the total signal $Itot^N$ due to the presence of cobalt 60 in the detector 1, the calibration factor $C\_UCO^N$ at the given instant $T^N$ being assessed as a function of the calibration factor $C\_UCO^{N-1}$ assessed at the preceding instant $T^{N-1}$, of the slope $SLOPE^{N-1}$, and of the period $\Delta T$ separating the given instant $T^N$ from the preceding instant $T^{N-1}$;

assessing a corrected signal $I^N$ representative of the neutron flux at the detector from the total signal $Itot^N$ and from the calibration factor $C\_UCO^N$.

The total signal $Itot^N$ is the signal delivered by the neutron detector 1. The slope $SLOPE^{N-1}$ and the calibration factor $C\_UCO^N$ are determined by means of the following equations:

$$SLOPE^{N-1} = \alpha \times Fcharge^{N-1} \times I^{N-1} - \beta \times C\_UCO^{N-1}$$

$$C\_UCO^N = C\_UCO^{N-1} + SLOPE^{N-1} \times \Delta T$$

wherein:

the index N corresponds to the iteration N (instant $T^N$), $I^{N-1}$ corresponds to the corrected signal assessed at the preceding instant $T^{N-1}$, $\alpha$ and $\beta$ are predetermined constants, $Fcharge^{N-1}$ is a load factor representative of the time-dependent change of the power of the reactor between the preceding instant $T^{N-1}$ and the given instant $T^N$, $\Delta T$ is the duration of the period separating the instant $T^{N-1}$ from the instant $T^N$.

$\alpha$ and $\beta$ for example have the values of $3.310^{-9}$ s$^{-1}$, and $4.1710^{-9}$ s$^{-1}$ respectively $\Delta T$ may be constant, or on the contrary may be variable.

The relevance of these equations is based on the following considerations.

The time-dependent change of the number of cobalt 60 atoms in the central emitter 5 of the cobalt neutron detector 1 is governed by the following equation:

$$\frac{dN_{60}}{dt} = N_{59} \cdot \left(\sum_i \sigma_i^{59} \phi_i\right) - \lambda_{60} N_{60}$$

wherein:

$N_{59}$ and $N_{60}$ are the number of nuclei of the 59 and 60 isotopes of cobalt in the central emitter 5 of the neutron detector 1;

$\sigma_i^{59}$ is the absorption cross-section of cobalt 59 for neutrons of the group of energy i;

$\Phi_i$ is the flux of neutrons of energy of the group i around the neutron detector 1;

$\lambda_{60}$ is the radioactive decay constant of cobalt 60, itself depending on the half-life of cobalt 60.

This equation, rewritten by means of the components of the signal delivered by the neutron detector 1, becomes:

$$\frac{dI_{60}}{dt} = \alpha(I_{tot} - I_{60}) - \beta I_{60}$$

wherein:

Itot is the total signal delivered by the neutron detector 1;

$I_{60}$ is the delayed component of the total signal Itot due to the presence of cobalt 60 in the detector;

$\alpha$ and $\beta$ are the constants mentioned above.

If an instantaneous equation of change having the same form as the equation above is adopted for the calibration factor C_UCO, the following equation is obtained:

$$\frac{dC\_UCO}{dt} = \alpha(I) - \beta C\_UCO$$

wherein $\alpha$ and $\beta$ are the parameters defined earlier,

I is the corrected signal, i.e. the total signal generated by the neutron detector 1 from which the calibration factor C_UCO was inferred.

$Fcharge^{N-1}$ is determined at each given instant $T^N$ by calculating the average power of the reactor (integral of the power of the reactor) locally around the detector 1 between the preceding instant $T^{N-1}$ and the given instant $T^N$, and by dividing said average power by the value of the power of the reactor locally around the detector 1 at the preceding instant $T^{N-1}$. In other words, the load factor $Fcharge^{N-1}$ is calculated according to the following equation:

$$Fcharge^{N-1} = \left(\int_{TN-1}^{TN} P(t)\right) \bigg/ (P^{N-1} \cdot \Delta T)$$

wherein P(t) is the local power of the reactor around the detector, and $P^{N-1}$ is the local power of the reactor around the detector at instant $T^{N-1}$.

Thus, if the power of the reactor between the instants $T^{N-1}$ and $T^N$ remains constant and equal to the power of the reactor at instant $T^{N-1}$, the load factor $Fcharge^{N-1}$ will be taken equal to 1. On the contrary, if the power of the reactor changes between the instants $T^{N-1}$ and $T^N$, this time-dependent change will be taken into account by the load factor $Fcharge^{N-1}$, which will then be different from 1.

Initialization of the algorithm is accomplished when the reactor is stopped, by measuring the signal delivered by the cobalt neutron detector 1. This signal is strictly equal to the delayed component $I_{60}$ due to cobalt 60 in the detector 1, i.e. to the natural decay of cobalt 60 found in the central emitter 5 of the neutron detector 1. $C\_UCO^0$ is selected to be equal to the thereby measured value. After starting the reactor, at a plurality of instants $T^N$ the following steps are carried out:

determination of the period $\Delta T$ between $T^{N-1}$ and $T^N$;

determination of the load factor $Fcharge^{N-1}$ representative of the time-dependent change of the power of the reactor locally around the detector around the instant $T^{N-1}$ and $T^N$;

determination of the slope $SLOPE^{N-1}$, representative of the time-dependent change of the calibration factor between the preceding instant $T^{N-1}$ and the given instant $T^N$;

determination of the calibration factor $C\_UCO^N$ representative of the delayed component $I_{60}$ of the total signal $Itot^N$ due to the decay of cobalt 60 in the detector 1;

acquisition of the total signal $Itot^N$ delivered by the cobalt neutron detector 1;

assessment of the corrected signal $I^N$ and storage and memory of this parameter.

The period $\Delta T$ between two instants $T^{N-1}$ and $T^N$ is typically of the order of 1 month.

This algorithm is recurrently repeated at different instants $T^N$, until the next shut-down of the reactor. A new initialization is then carried out during the following shut-down, by measuring the signal delivered by the neutron detector 1 and assignment of the latter to $C\_UCO^0$.

The algorithm described above has the advantage of being stable. Thus, any difference between the delayed component $I_{60}$ and the calibration factor $C\_UCO^N$ at instant $T^N$ is not amplified in the following iterations. If at an instant $T^N$, the calibration factor $C\_UCO^N$ is greater than the delayed component $I_{60}$, at the instant following the time-dependent change of the calibration factor, it will be smaller than the time-dependent change of the delayed component $I_{60}$, so that the difference will decrease. Indeed, if one has:

$$C\_UCO > I_{60} \text{ then } Itot - C\_UCO < Itot - I_{60}.$$

Further, $$\frac{dI_{60}}{dt} = \alpha(I_{tot} - I_{60}) - \beta I_{60} \text{ and } \frac{dC\_UCO}{dt}$$
$$= \alpha(I_{tot} - C\_UCO) - \beta C\_UCO$$
$$\alpha(Itot - I_{60}) > \alpha(Itot - C\_UCO) \text{ and } -\beta I_{60} > -\beta C\_UCO$$

whence $$\frac{dI_{60}}{dt} > \frac{dCUCO}{dt}$$

Figure 5:
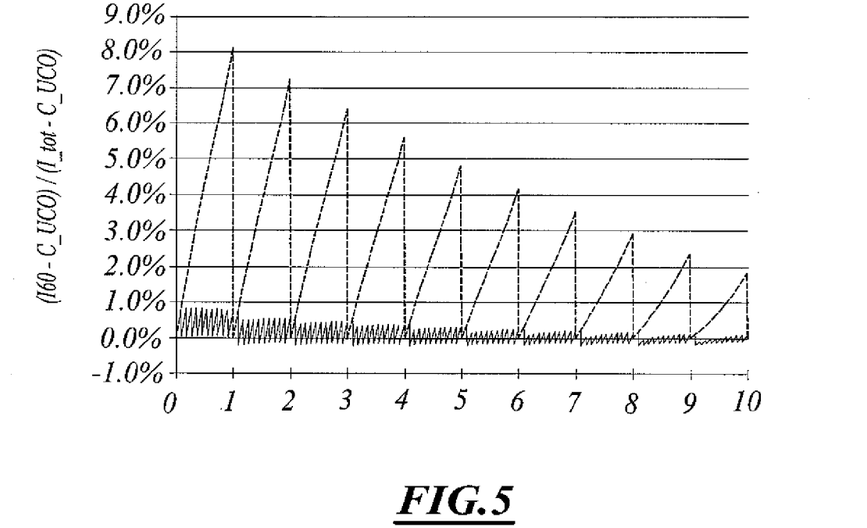
FIG. 5 is a simulation of the time-dependent change versus time of the difference between the delayed component of the total signal due to the presence of cobalt 60 in the detector and the calibration factor calculated according to the invention (in solid lines), and of the difference between the delayed component and the calibration factor assessed at the beginning of each cycle and then considered as constant along the cycle (in dashed lines)

In FIG. 5 the time-dependent change of the difference between the calibration factor $C\_UCO$ and the delayed component $I_{60}$ is illustrated for two methods for computing the calibration factor $C\_UCO$. The difference is in ordinates in FIG. 5, it is expressed in %. It is calculated according to the following formula:

$$\text{Difference} = (I_{60} - C\_UCO)/(Itot - C\_UCO)$$

The abscissa corresponds to the time, expressed as a full power yearly equivalent.

The curve in solid lines corresponds to the method for assessing the calibration factor $C\_UCO$ discussed above, the calibration factor $C\_UCO$ is reinitialized after each full power yearly equivalent, i.e. at graduations 0, 1, 2, etc. . . . .

The curve in dashed lines corresponds to a method in which the calibration factor $C\_UCO$ is initialized at each shut-down of the reactor, and is then maintained constant. Thus, the calibration factor $C\_UCO$ is reinitialized at graduations 0, 1, 2, etc. . . . , i.e. all the full power yearly equivalents.

It is seen in FIG. 5 that the method described above is much more accurate, the difference being less than 1%.

The curves of FIG. 5 were determined by carrying out a simulation of the operation of the core of the reactor, and of the behavior of the cobalt neutron detector 1. Such a simulation involves unwieldy computations and input data specific to the loading of the core and to the wear of each neutron detector 1. On the contrary, the method of the invention only involves simple computations, which may be easily and rapidly performed by a computer, with very little input data accessible by measurement.

Figure 6:
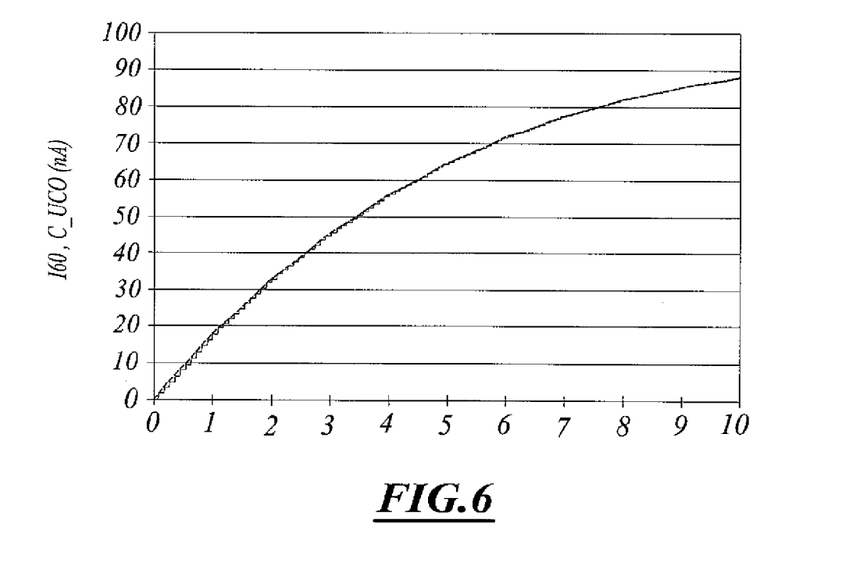
FIG. 6 is a graphic illustration versus time of the calibration factor assessed according to the invention (solid lines) and of the delayed component of the total signal (dashed lines)

In FIG. 6, the time-dependent change of the delayed component $I_{60}$ is illustrated (dashed lines) and of the calibration factor $C\_UCO$ computed by the method described above (solid lines). The time in abscissae is expressed in full power yearly equivalents. It is seen that $C\_UCO$ follows $I_{60}$ with a very small difference.

The device provided for applying the method described above is illustrated in FIG. 7.

Figure 7:
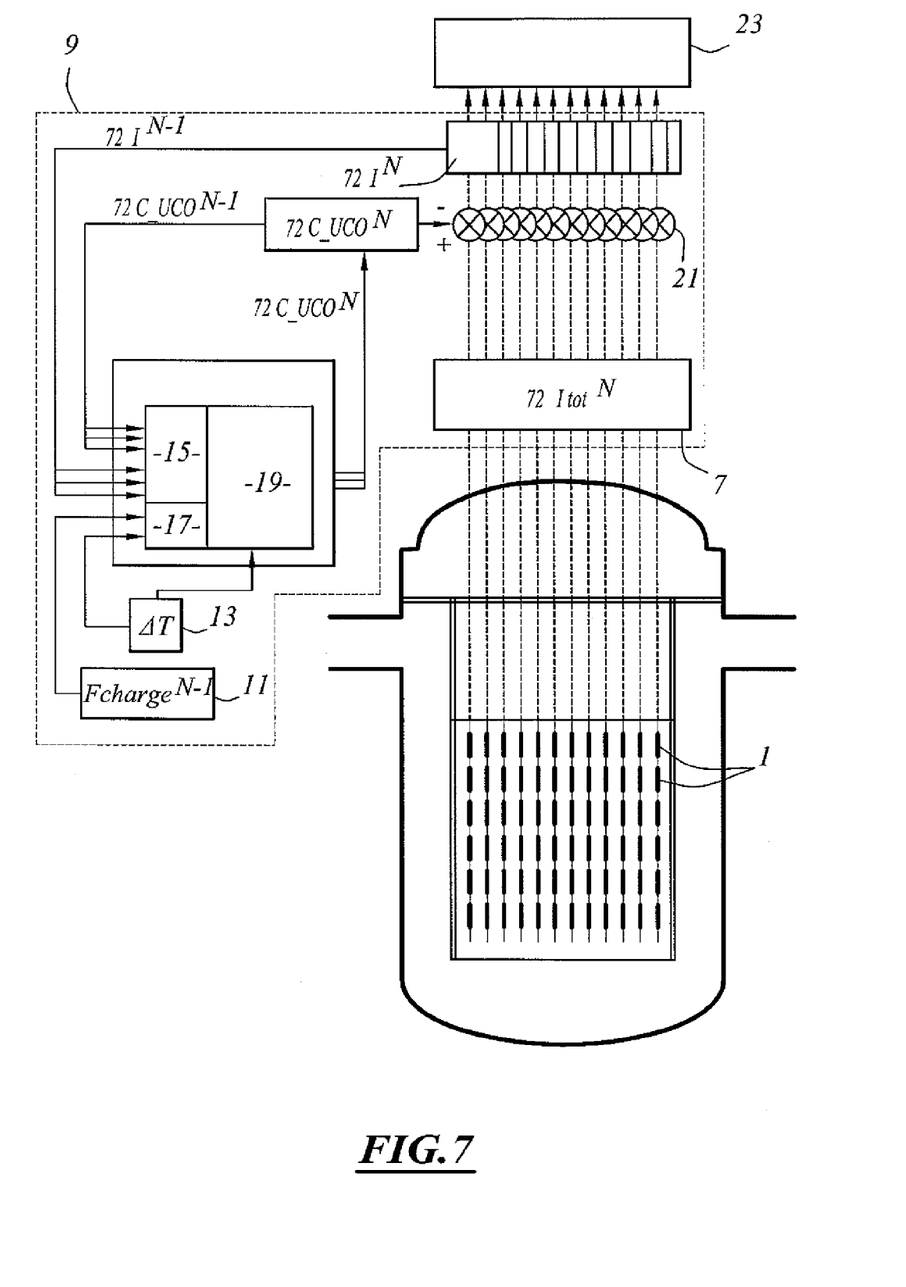
FIG. 7 is a simplified schematic illustration of the device for applying the invention.

The device for example includes 72 cobalt neutron detectors 1, distributed in the core of the nuclear reactor. These neutron detectors 1 are fixed.

The neutron detectors 1 are for example distributed in 12 columns, each column including six detectors. In each column, the neutron detectors 1 are positioned vertically, one above the other. They are regularly spaced out from each other. The 12 columns are distributed in different locations of the core of the reactor.

The measurement device also includes a computer 9, symbolized by a frame in dash-dot lines in FIG. 7. The computer 9 includes the device 7 for amplifying and digitizing the total signals from the neutron detectors 1. Each neutron detector 1 is connected to a distinct channel of the device 7, which is specific to it.

The device 7 therefore forms means for acquiring at given instants $T^N$, the total signal $Itot^N$ provided by each neutron detector 1.

The computer 9 moreover includes means 11 for assessing the load factor $Fcharge^{N-1}$, at each given instant $T^N$, by computing the average power of the reactor locally around each cobalt neutron detector 1 between the preceding instant $T^{N-1}$ and the given instant $T^N$, and by dividing this average power by the value of the power of the reactor locally around said detector 1 at the preceding instant $T^{N-1}$. The computer 9 recovers the data relating to the power in the operating system of the nuclear power station.

Moreover, the computer 9 includes means 13 for calculating the elapsed time period from the preceding instant $T^{N-1}$ to the given instant $T^N$.

The computer 9 also includes memories 15 provided for storing the 72 corrected signals $I^{N-1}$ computed at the preceding instant $T^{N-1}$ and the 72 calibration factors $C\_UCO^{N-1}$ computed at the preceding instant $T^{N-1}$.

The computer 9 further includes means 17 for assessing the $SLOPE^{N-1}$ at the given instant $T^N$ for each cobalt neutron detector 1 as a function of the corrected signal $I^{N-1}$ stored in memory and of the calibration factor $C\_UCO^{N-1}$ stored in memory. The computation is carried out by using the equation described above.

The computer 9 further includes means 19 for computing the calibration factor $C\_UCO^N$ of each of the cobalt neutron detractors 1 at a given instant $T^N$, as a function of the calibration factor $C\_UCO^{N-1}$ stored in memory, of the $SLOPE^{N-1}$ and of the period $\Delta T$ separating the given instant $T^N$ from the preceding instant $T^{N-1}$.

Further, the computer 9 includes means 21 for computing, for each cobalt neutron detector 1, independently of the others, the corrected signal $I^N$, by difference between the total signal $Itot^N$ and the calibration factor $C\_UCO^N$ at instant $T^N$.

The corrected signals of each of the neutron detectors 1 may then be exploited by the monitoring and protection systems 23 of the nuclear power station.

The method for measuring the neutron flux described above has multiple advantages.

Because this method comprises several steps recurrently performed at instants spaced out over a period, the method comprising at each given instant the following steps:

acquiring a signal Itot by means of a cobalt neutron detector 1 placed inside the core of the reactor;

assessing a calibration factor $C\_UCO$ representative of the delayed component $I_{60}$ of the total signal Itot due to the presence of cobalt 60 in the neutron detector 1;

assessing a corrected signal representative of the neutron flux at the neutron detector 1 from the total signal Itot and from the calibration factor $C\_UCO$;

assessing a slope SLOPE representing the time-dependent change of the calibration factor $C\_UCO$ between the preceding instant and the given instant;

the calibration factor C_UCO at the given instant being assessed as a function of the calibration factor C_UCO assessed at the preceding instant, of the slope SLOPE and of the time period separating the given instant from the preceding instant, the method allows very accurate measurement of the neutron flux without any significant deterioration of the ratio between the useful signal and the total signal Itot of the detector 1 in the long run.

The delayed component $I_{60}$ due the presence of cobalt 60 in the central emitter 5 and to its natural decay, is adequately corrected by a calibration factor C_UCO which is re-assessed at each iteration. The calibration factor C_UCO is advantageously re-assessed linearly by taking into account a slope SLOPE. Such a linear re-assessment nevertheless gives the possibility of guaranteeing good accuracy, since the time-dependent change of the delayed component $I_{60}$ of the signal is linear over limited time intervals, of the order of one month.

The slope SLOPE is itself re-assessed periodically, by using a simple equation, the form of which is derived from the time-dependent equation of cobalt 60 within the central emitter 5 of the cobalt neutron detector 1. Such an equation gives the possibility of obtaining excellent accuracy of the measurement method. The equation with which the slope SLOPE may be re-updated takes into account a load factor Fcharge, representative of the time-dependent change of the power of the reactor locally around the detector between the preceding instant and the given instant, which contributes to adapting the algorithm to an operation of the power station while tracking the load for which the power may vary between two instants $T^N$.

The method is very simple to use, since the input data are provided to the algorithm by direct read-out of the total signal Itot of the cobalt neutron detectors 1, and by the results of the preceding iterations. It only requires for initialization, measurements of the signal delivered by each of the neutron detectors 1 when the reactor is stopped, and the power is zero. These signals are considered as being the initial calibration factors $C\_UCO^0$ to be taken into account.

The method only applies rapid and minor computations, so that the algorithm may be directly integrated into a computer calibration tool, used automatically. This reduces the risks of human error.

An entirely theoretical computation, modeling the calibration factor C_UCO in a specific way depending on the wear of the detector 1 under a neutron flux, would require detailed knowledge of the values of the neutron flux locally around the detector 1 all along the operating cycle, and specific knowledge of the degree of wear of the detector 1 at the beginning of the cycle. These values are different for each of the detectors 1, are very dependent on the localization of the detector 1 within the core and depend on the history of the flux all along the use of the detector 1. Specific pieces of equipment and individual tracking of the detectors 1 would therefore be required.

The method is applicable when the reactor operates with load tracking, or in prolonged operation at reduced power (PORP), because of the taking into account of the parameter Fcharge.

Further, the method is stable, because any error in the calibration factor C_UCO, for example resulting from a measurement error, is naturally reduced by the algorithm.

The method does not require any specific neutronic calculation for anticipating the time-dependent change of the retarded component $I_{60}$ due to cobalt 60. It only requires knowledge of the calibration factor C_UCO from the preceding iteration, of the corrected signal I assessed at the preceding iteration, of the time having elapsed between two iterations, and in the case of operation with load tracking, of the local load factor Fcharge at the detector 1.

The method uses data specific to each cobalt neutron detector 1 and thus allows individual processing of each detector 1 with a specific correction parameter taking into account the different wear of each of the detectors 1.

Thus, the accuracy of the measurements of each cobalt neutron detector 1 is improved, which has advantages in terms of safety (better knowledge of neutron fluxes) and economic advantages (improvement in the operating margins of the reactor, better processing of the wear of the cobalt neutron detectors 1).

The device described above may have multiple alternatives.

The load factor $Fcharge^{N-1}$ may be assessed by considering not the time-dependent change in the reactor power locally around the detector but the time-dependent change in the overall power of the reactor between the preceding instant $T^{N-1}$ and the given instant $T^N$. In this case, the load factor $Fcharge^{N-1}$ is the same for all the detectors and the correction is less accurate. It is then assessed from the average power of the reactor between the preceding instant $T^{N-1}$ and the given instant $T^N$, and by dividing said average power by the value of the power of the reactor at the preceding instant $T^{N-1}$. The average power of the reactor between $T^{N-1}$ and $T^N$ may be assessed for example by dividing the number of full power equivalent days between $T^{N-1}$ and $T^N$ by the number of days having elapsed between $T^{N-1}$ and $T^N$. The number of full power equivalent days may be recovered in a computer of the nuclear power station.

The measurement device may include any number of cobalt neutron detectors 1, <72 or >72.

The period $\Delta T$ separating two consecutive instants $T^N$ and $T^{N+1}$ may be constant or may be variable.

What is claimed is:

1. A method for measuring a neutron flux in a core of a nuclear reactor, the method comprising several steps recurrently performed at instants separated by a period, the method comprising at each given instant the following steps:
    acquiring a total signal by a cobalt neutron detector placed inside the core of the reactor;
    assessing a calibration factor representative of a delayed component of the total signal due to a presence of cobalt 60 in the cobalt neutron detector;
    assessing a corrected signal representative of the neutron flux at the cobalt neutron detector from the total signal and from the calibration factor;
    assessing a slope representative of a time-dependent change in the calibration factor between a preceding instant and a given instant;
    wherein the calibration factor at the given instant is being assessed as a function of the calibration factor assessed at the preceding instant, of the slope, and of the period separating the given instant from the preceding instant.

2. The measurement method according to claim 1, wherein the neutron detector is a fixed detector.

3. The measurement method according to claim 1, wherein the slope at the given instant is assessed at least as a function of the corrected signal at the preceding instant and of the calibration factor at the preceding instant.

4. The measurement method according to claim 3, wherein at each given instant the measurement method comprises a step for assessing a load factor representative of the time-dependent change in a power of the reactor locally around the neutron detector between the preceding instant and the given instant, the slope at the given instant being assessed also as a function of the load factor.

5. The measurement method according to claim 4, wherein the load factor at each given instant is assessed by calculating an average power of the reactor locally around the neutron detector between the preceding instant and the given instant, and by dividing the average power by the value of the power of the reactor locally around the neutron detector at the preceding instant.

6. The measurement method according to claim 3, wherein at each given instant the measurement method comprises a step for assessing a load factor representative of a time-dependent change in a power of the reactor between the preceding instant and the given instant, the slope at the given instant also being assessed as a function of the load factor.

7. A device for measuring a neutron flux in a core of a nuclear reactor, the measurement device comprising at least one cobalt neutron detector placed inside the core of the reactor and a computer;
the computer having an acquiring device for recurrently acquiring at given instants separated by a period, a total signal by the neutron detector;
the computer having a calibration assessor for assessing at each given instant a calibration factor representative of a delayed component of the total signal due to the presence of cobalt 60 in the neutron detector;
the computer having a signal assessor for assessing at each given instant a corrected signal representative of the neutron flux at the neutron detector from the total signal and from the calibration factor;
the computer having a slope assessor for assessing at each given instant a slope representative of the time-dependent change in the calibration factor between the preceding instant and the given instant;
the calibration assessor for assessing the calibration factor being capable of assessing the calibration factor at the given instant as a function of the calibration factor assessed at a preceding instant of the slope, and of the period separating the given instant from the preceding instant.

8. The measurement device according to claim 7, wherein the neutron detector is a fixed detector.

9. The measurement device according to claim 7, wherein the slope assessor is capable of assessing the slope at the given instant at least as a function of the corrected signal at the preceding instant and of the calibration factor at the preceding instant.

10. The measurement device according to claim 9, further comprising a load factor assessor for assessing at each given instant a load factor representative of the time-dependent change in a power of the reactor locally around the detector between the preceding instant and the given instant, the slope assessor device being capable of assessing the slope at the given instant also as a function of the load factor.

11. The measurement device according to claim 10, the load factor assessor being capable of assessing the load factor at each given instant by calculating an average power of the reactor locally around the neutron detector between the preceding instant and the given instant, and by dividing the average power by a value of the power of the reactor locally around the neutron detector at the preceding instant.

12. The measurement device according to claim 7, wherein the acquiring device is an amplification and digitizing device.

* * * * *